US012723180B2

(12) United States Patent
Contrada et al.

(10) Patent No.: US 12,723,180 B2
(45) Date of Patent: Sep. 1, 2026

(54) SELF-ADHERING ARTICLE

(71) Applicant: Vybond Group, Inc., Franklin, KY (US)

(72) Inventors: Svetlana Contrada, Manalapan, NJ (US); Paul Connolly, Evansville, IN (US); Kyle Immel, Evansville, IN (US)

(73) Assignee: Vybond Group, Inc., Franklin, KY (US)

( * ) Notice: Subject to any disclaimer, the term of this patent is extended or adjusted under 35 U.S.C. 154(b) by 124 days.

(21) Appl. No.: 18/426,592

(22) Filed: Jan. 30, 2024

(65) Prior Publication Data

US 2024/0271015 A1 Aug. 15, 2024

Related U.S. Application Data

(60) Provisional application No. 63/444,519, filed on Feb. 9, 2023.

(51) Int. Cl.

| | |
|---|---|
| ***C09J 7/40*** | (2018.01) |
| ***B32B 7/14*** | (2006.01) |
| ***C09J 7/21*** | (2018.01) |
| ***C09J 7/26*** | (2018.01) |
| ***C09J 7/29*** | (2018.01) |

(52) U.S. Cl.

CPC .................. *C09J 7/40* (2018.01); *B32B 7/14* (2013.01); *C09J 7/21* (2018.01); *C09J 7/26* (2018.01); *C09J 7/29* (2018.01); *B32B 2250/04* (2013.01); *B32B 2307/718* (2013.01); *B32B 2307/724* (2013.01); *B32B 2307/7265* (2013.01); *B32B 2307/7376* (2023.05); *C09J 2301/122* (2020.08); *C09J 2301/162* (2020.08);

(Continued)

(58) Field of Classification Search

None

See application file for complete search history.

(56) References Cited

U.S. PATENT DOCUMENTS 5,178,932 A * 1/1993 Perkins .................. B32B 27/34 428/447
5,374,477 A * 12/1994 Lawless ................ E04B 1/6809 428/317.5

(Continued)

FOREIGN PATENT DOCUMENTS

WO 2004051019 A1 6/2004

OTHER PUBLICATIONS

Written Opinion issued in corresponding International Application No. PCT/US2024/013439 mailed Jan. 16, 2025, all pages cited in its entirety.

(Continued)

*Primary Examiner* — Frank D Ducheneaux

(74) *Attorney, Agent, or Firm* — Barnes & Thornburg LLP

(57) ABSTRACT

Self-adhering articles comprising (i) a weather resistive barrier comprising a first nonwoven fabric attached to a first vapor-permeable and liquid impermeable (VPLI) film, (ii) an adhesive layer comprising an adhesive composition, in which the adhesive layer is located adjacent the first nonwoven fabric, and wherein the first nonwoven fabric is located between the first VPLI film and the adhesive layer; and (iii) a release liner located adjacent the adhesive layer, wherein the adhesive layer is located between the first nonwoven fabric and the release liner are provided.

15 Claims, 9 Drawing Sheets

(52) U.S. Cl.
CPC .... *C09J 2301/204* (2020.08); *C09J 2301/312* (2020.08); *C09J 2400/263* (2013.01)

(56) References Cited

U.S. PATENT DOCUMENTS

| | | | | |
|---|---|---|---|---|
| 6,309,730 | B1 * | 10/2001 | Sumi | C09J 7/201 428/339 |
| 6,901,712 | B2 | 6/2005 | Borenstein | |
| 7,101,598 | B2 | 9/2006 | Hubbard | |
| 8,277,915 | B2 | 10/2012 | Couturier | |
| 9,157,238 | B2 | 10/2015 | Linnenbrink et al. | |
| 10,704,254 | B2 | 7/2020 | Seabaugh et al. | |
| 11,365,328 | B2 | 6/2022 | Seabaugh et al. | |
| 2004/0180195 | A1 | 9/2004 | Macuga | |
| 2012/0034837 | A1 | 2/2012 | Ngai | |
| 2016/0176168 | A1 | 6/2016 | Zhao | |
| 2017/0198470 | A1 | 7/2017 | Hickie et al. | |
| 2018/0237662 | A1 * | 8/2018 | Widenbrant | B32B 5/026 |
| 2021/0309891 | A1 | 10/2021 | Schoenbrodt et al. | |
| 2022/0170262 | A1 | 6/2022 | Lolley | |

OTHER PUBLICATIONS

Notification of transmittal of the International preliminary report on patentability from the corresponding PCT Application No. PCT/US2024/013439, mailed Apr. 23, 2025, all pages cited in its entirety.
International Search Report and Written Opinion issued in corresponding International Application No. PCT/US2024/013439 mailed May 6, 2024, all pages cited in its entirety.

* cited by examiner

SELF-ADHERING ARTICLE

CROSS-REFERENCE TO RELATED APPLICATIONS

This application claims priority under 35 U.S.C. § 119 to U.S. Patent Application No. 63/444,519 filed Feb. 9, 2023, which is expressly incorporated by reference herein in its entirety.

TECHNICAL FIELD

Embodiments of the presently-disclosed invention relate generally to self-adhering articles comprising (i) a weather resistive barrier comprising a first nonwoven fabric attached to a first vapor-permeable and liquid impermeable (VPLI) film, (ii) an adhesive layer comprising an adhesive composition; and (iii) a release liner located adjacent the adhesive layer, wherein the release liner may be peeled away to expose the adhesive layer prior to mounting the self-adhering article to a surface.

BACKGROUND

Over time, moisture can accumulate within the structure of a building, causing premature deterioration and damage. This problem is particularly common in areas with high humidity and rainfall such as the Pacific Northwest. In this regard, a housewrap is used to wrap the exterior surface of a house or other building during its construction and, more particularly, after attachment of sheathing and prior to installation of siding/cladding. Housewrap is typically provided in roll form, whereby sheets of suitable lengths may be conveniently dispensed (e.g., unrolled) and then separated (e.g., cut, torn, etc.) from the remainder of the roll.

Housewrap commonly comprises a barrier layer which provides a moisture barrier against outside water or moisture, yet allows water vapor transmission from the interior of the housing. In this manner, the passage of liquid water and air (e.g., rain and wind) into the building structure is restricted, thereby preventing the water damage of insulation and structural members and minimizing air movement within the walls. At the same time, water vapor which enters the walls from the interior of the building structure can exit so that it does not condense within the wall and potentially damage insulation and structural members.

A plurality of housewrap sheets are required to cover a house or other building. For example, long strip-like sheets can be dispensed from a roll and then hung vertically (like wallpaper) along, or run horizontally across, the building. The housewrap sheets can be attached to the sheathing using staples, large head nails, or plastic washer nails. Horizontal and vertical joints (or seams) will exist between adjacent housewrap sheets, and these can be taped or otherwise sealed to render the joint(s) air and water tight. Such mechanical attachment means, however, can negatively impact the effectiveness of the housewrap due to the formation of holes through the housewrap associated with the mechanical fasteners (e.g., staples, nails, etc.).

Therefore, there at least remains a need in the art for a self-adhering article (e.g., housewrap) that negates the need for the use of mechanical fasteners for attachment to buildings of interest.

SUMMARY OF INVENTION

One or more embodiments of the invention may address one or more of the aforementioned problems. Certain embodiments according to the invention provide a self-adhering article, such as a housewrap, comprising (i) a weather resistive barrier comprising a first nonwoven fabric attached to a first vapor-permeable and liquid impermeable (VPLI) film, (ii) an adhesive layer comprising an adhesive composition, in which the adhesive layer may be located adjacent the first nonwoven fabric, and wherein the first nonwoven fabric is located between the first VPLI film and the adhesive layer; and (iii) a release liner located adjacent the adhesive layer, wherein the adhesive layer is located between the first nonwoven fabric and the release liner.

In another aspect, certain embodiments of the invention provide a method of making a self-adhering article, such as a housewrap. The method may comprise the following: (i) melt extruding a first vapor-permeable and liquid impermeable (VPLI) film directly onto a first surface of a first nonwoven fabric to form a weather resistive barrier or providing a weather resistive barrier comprising a first VPLI melt-extruded onto the first nonwoven fabric; (ii) depositing an adhesive layer comprising an adhesive composition directly onto a second surface of the first nonwoven fabric, wherein the first nonwoven fabric is located between the first VPLI film and the adhesive layer; and (iii) applying a release liner over and in contact with the adhesive layer, wherein the adhesive layer is located between the first nonwoven fabric and the release liner to form a self-adhering article.

In yet another aspect, certain embodiments of the invention provide a building assembly, in which the building assembly may comprise an inner sheathing member, an exterior building material, and a self-adhering article, such as those described and disclosed herein, wherein a release liner has been stripped (e.g., peeled) away and an adhesive layer bonds the weather resistive barrier to the interior sheathing member.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
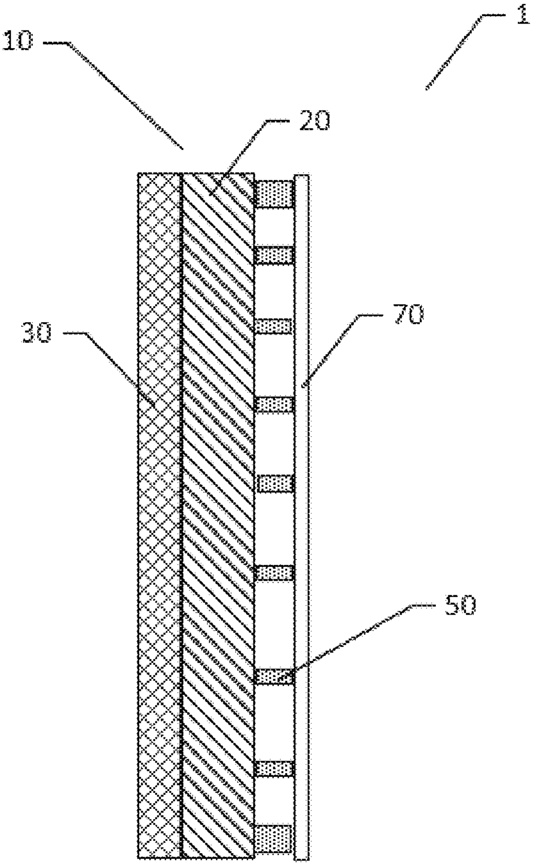
FIG. 1 illustrates a self-adhering article including a discontinuous adhesive layer sandwiched between a release liner and a first nonwoven fabric in accordance with certain embodiments of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to a self-adhering article, such as a housewrap, comprising a weather resistive barrier including at least a first VPLI film attached to a first nonwoven fabric. The weather resistive barrier resists the ingress or passage of bulk liquid and air from an exterior environment, while also allowing water vapor to pass therethrough to prevent the accumulation of undesirable moisture underneath the self-adhering article when installed on a building. The self-adhering article may comprise a release liner that may be peeled away to reveal or expose a layer of adhesive, which may be a discontinuous or continuous layer of an adhesive composition. After removal of at least a portion of the release liner, the self-adhering article may adhered to a building structure via the exposed adhesive layer. In this regard, a building may be encased (e.g., enveloped) by a plurality of such self-adhering articles without the need to use mechanical fasteners, such as nails and staples, that may impart holes through the weather resistive barrier component of the self-adhering articles. In accordance with certain embodiment of the invention, the self-adhering articles may simultaneously provide a range of improved properties, such as increased tensile strength, and improved cold pliability.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process. In certain instances, the "nonwoven web" may comprises a plurality of layers, such as one or more spunbond layers and/or one or more meltblown layers. For instance, a "nonwoven web" may comprises a spunbond-meltblown-spunbond structure.

The terms "fabric" and "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to bond at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®. Spunbond fibers, for example, comprise continuous fibers.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers.

The term "meltblown shot", as used herein, may comprise a coarse non-uniform or non-continuous layer applied in a meltblown process deliberately operated to generate random globules of a polymer interconnected with strands. Moreover, the term "meltblown rope", as used herein, may also comprise a coarse non-uniform or non-continuous layer applied in a meltblown process deliberately operated to generate random "ropes" or bundles of a polymer interconnected with strands. Meltblown rope differs from meltblown shot in that meltblown rope may be more elongated and/or narrower than meltblown shot. Both the meltblown ropes and/or meltblown shot may comprise irregularly shaped fibers, wads, or particles. In this regard, for example, the meltblown ropes and/or meltblown shot may comprise fibers, wads, particles, or globules having non-circular cross-sections. The meltblown ropes and/or meltblown shot may be randomly and irregularly distributed on a surface. For example, the meltblown ropes and/or meltblown shot may extend on random paths and may intersect and/or cross at random locations. However, the meltblown ropes and/or meltblown shot may not intersect or cross at all.

The term "non-continuous", as used herein, may comprise a layer of meltblown shot and/or meltblown ropes. The meltblown shot and/or meltblown ropes may be isolated from each other, although some of the meltblown shot and/or meltblown ropes may connect to each other. In this regard, a non-continuous meltblown layer deposited onto an underlying material (e.g., a weather resistive barrier) would not cover 100% of the surface area of the underlying material. The term "non-uniform", as used herein, may comprise a continuous layer of meltblown fibers having varying thicknesses throughout and including three-dimensional portions including meltblown shot, meltblown ropes and/or the like.

The term "film", as used herein, may comprise a polymeric or elastomeric layer or layers made using a film extrusion process, such as a cast film or blown film extrusion process. This term may also include films rendered microporous by mixing polymer and/or elastomer with filler, forming a film from the mixture, and optionally stretching the film.

The term "microporous" film, as used herein, may comprise films or membranes having a narrow pore sized distribution in the submicron range, from 1.0 to 10 microns. The microporous films can be made by a number of processes, which include (a) dissolving polymers in solution followed by extraction of the solvent by water vapor, (b) stretching of crystallizable polymers which results in micro-sized tears, and (c) stretching of a mineral filled polyolefin film. The polymers used in the microporous films include PTFE, polyolefins, polyurethanes, polyamides, and polyesters.

As used herein, the term "monolithic" film may comprise any film that is continuous and substantially free or free of pores. In certain alternative embodiments of the invention, a "monolithic" film may comprise fewer pore structures than would otherwise be found in a microporous film. According to certain non-limiting exemplary embodiments of the invention, a monolithic film may act as a barrier to liquids and particulate matter but allow water vapor to pass through.

The term "weather resistive barrier", as used herein, may comprise a material, such as a sheet-like material, that may function as an air barrier to generally prevent air penetration to mitigate against drafts and provide bulk water resistance to help prevent bulk water from passing there-through. In certain embodiments, a "weather resistive barrier", as used herein, may also provide moderate to high vapor permeability to allow and water that may become "trapped" behind the weather resistive barrier to evaporate to prevent the formation of mold. Such materials may generally be marketed as a "housewrap". In accordance with certain embodiments of the invention, the weather resistive barrier may include any current or future commercially available housewrap. Examples of weather resistive barriers, which are currently marketed as housewraps, include (but not limited to) TYPAR® (by Berry Global of Evansville, Indiana), Tyvek® line or wraps (Dupont™, U.S.A.), Fabrene® Air-Gard® (by Berry Global of Evansville, Indiana), Fabrene® Air-Gard® Value (by Berry Global of Evansville, Indiana), Fabrene® Air-Gard® XL (by Berry Global of Evansville, Indiana), and CertaWrap™ (CertainTeed Corporation, U.S.A.). In this regard, the structure of weather resistive barriers can vary, including micro-porous films, monolithic films, fibrous structures (e.g., woven and/or nonwoven materials), and composite-type materials including a fibrous structure coupled with a film, such as TYPAR®. In certain embodiments of the invention, the weather resistive barrier may be devoid of any film, such as Tyvek®. Tyvek®, for instance, utilizes fine high-density polyethylene (HDPE) spun fibers that are fused together to form a uniform web having numerous extremely small pores that resist bulk water and air penetration, while allowing moisture vapor to pass.

The term "layer", as used herein, may comprise a generally recognizable combination of similar material types and/or functions existing in the X-Y plane.

The term "machine direction" or "MD", as used herein, comprises the direction in which the fabric produced or conveyed. The term "cross-direction" or "CD", as used herein, comprises the direction of the fabric substantially perpendicular to the MD.

The term "filler", as used herein, may comprise particles or aggregates of particles and other forms of materials that can be added to a polymeric film blend. According to certain embodiments of the invention, a filler may not substantially chemically interfere with or adversely affect the extruded film. According to certain embodiments of the invention, the filler is capable of being uniformly dispersed throughout the film or a layer comprised in a multilayer film. Fillers, for example, may comprise particulate inorganic materials such as, for example, calcium carbonate, various kinds of clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like. Filler particles may optionally be coated with a fatty acid, such as stearic acid or reduced stearic acid, or a larger chain fatty acid, such as behenic acid. Without intending to be bound by theory, coated filler particles may facilitate the free flow of the particles (in bulk) and their case of dispersion into the polymer matrix, according to certain embodiments of the invention.

Certain embodiments according to the invention provide a self-adhering article, such as a housewrap, comprising (i) a weather resistive barrier comprising a first nonwoven fabric attached to a first vapor-permeable and liquid impermeable (VPLI) film, (ii) an adhesive layer comprising an adhesive composition, in which the adhesive layer may be located adjacent the first nonwoven fabric, and wherein the first nonwoven fabric is located between the first VPLI film and the adhesive layer; and (iii) a release liner located adjacent the adhesive layer, wherein the adhesive layer is located between the first nonwoven fabric and the release liner.

Figure 2:
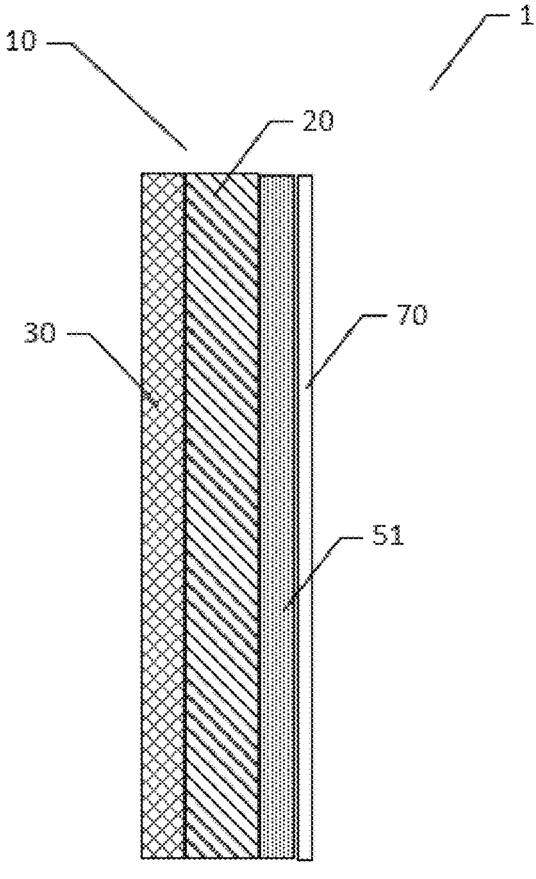
FIG. 2 illustrates a self-adhering article including a continuous adhesive layer sandwiched between a release liner and a first nonwoven fabric in accordance with certain embodiments of the invention.

FIG. 1, for instance, illustrates a self-adhering article 1 including a weather resistant barrier 10 comprising a first nonwoven fabric 20 and a first VPLI film 30. The self-adhering article 1 also includes a discontinuous adhesive layer 50 deposited onto the first nonwoven fabric 20, and release liner 70 disposed over the adhesive layer 50. FIG. 2 illustrates a self-adhering article similar to that of FIG. 1, but includes a continuous adhesive layer 51.

In accordance with certain embodiments of the invention, the first nonwoven fabric comprises at least one spunbond layer, at least one meltblown layer, or any combination thereof. For example, the first nonwoven fabric may comprise a spunbond nonwoven fabric comprising continuous spunbond fibers from one or multiple beams. The first nonwoven fabric may be consolidated by a thermal bonding operation, such as point bonding or ultrasonic bonding. Although a bonded area of the first nonwoven fabric may vary, the bonded area may comprise from about 5 to about 30%, such as at least about any of the following: 5, 8, 10, 12, and 15%, and/or at most about any of the following: 30, 28, 25, 22, 20, 18, and 15%. Additionally or alternatively, the first nonwoven fabric comprises at least one polyolefin, such as at least one polypropylene, at least one polyethylene, at least one ethylene-polypropylene impact copolymer, or any combination thereof. Additionally or alternatively, the first nonwoven fabric may comprise a polyester and/or a polyamide. The fibers (e.g., continuous spunbond fibers) may comprise monocomponent fibers and/or bicomponent fibers, such as side-by-side or sheath-and-core bicomponent fibers. Bicomponent fibers, for example, may comprise a first polyolefin forming a first component and a second polyolefin, a polyester, or a polyamide forming a second component of the bicomponent fiber. In this regard, the first polyolefin may have a lower melting point relative to the second polyolefin, the polyester, or the polyamide, such that the first polyolefin may be melted to consolidate the first nonwoven fabric while retaining the strength associated with the higher melting point component.

In accordance with certain embodiments of the invention, the first nonwoven fabric comprises a polymer component comprising at least one polyolefin, and optionally an additive component comprising one or more additive materials. The additive materials are not particularly limited, but may include UV stabilizers, fillers, antimicrobials, and antistatic agents. The additive component, for example, may comprise from about 0.1 to about 40% by weight of the first nonwoven fabric, such as at least about any of the following: 0.1, 0.5, 1, 3, 5, 8, and 10% by weight of the first nonwoven fabric, and/or at most about any of the following: 40, 35, 30, 25, 20, 18, 15, 12, and 10% by weight of the first nonwoven fabric. Additionally or alternatively, the polymer component comprises from about 60 to 100% by weight of the first nonwoven fabric, such as at least about any of the following: 60, 70, and 80% by weight of the first nonwoven fabric, and/or at most about any of the following: 100, 99, 98, 95, 90, 85, and 80% by weight of the first nonwoven fabric. Additionally or alternatively, the polymer component comprises from about 60 to 100% by weight of at least one polypropylene, such as at least about any of the following: 60, 70, and 80% by weight, and/or at most about any of the following: 100, 99, 98, 95, 90, 85, and 80% by weight.

In accordance with certain embodiments of the invention, the first nonwoven fabric may have a basis weight from about 50 to about 140 gsm, such as at least about any of the following: 50, 60, 70, 80, and 90 gsm, and/or at most about any of the following: 140, 130, 120, 110, 100, 100 and 90 gsm.

The first VPLI, in accordance with certain embodiments of the invention, may comprise or consist of single layer film. The single layer film, for example, may be a microporous film. The microporous film, for example, may comprise at least one polyolefin, such as at least one polypropylene, at least one propylene-containing copolymer, at least one polyethylene, at least one ethylene-containing copolymer, or any combinations thereof. The microporous film, for example, may include a plurality of filler particulates that facilitate the formation of the plurality of micron-sized pores. Alternatively, the single layer film may be a monolithic film. The monolithic film may comprise at least one highly breathable polymer, such as at least one of a thermoplastic urethane, a polyether-block-amide copolymer, a polyether-block-ester copolymer, polyester-block-amide copolymer, a copolyester thermoplastic elastomer, or blends thereof. The monolithic film, for example, may be devoid or substantially devoid of pores.

The first VPLI, in accordance with certain embodiments of the invention, may comprise a multilayer film comprising at least one microporous layer, at least one monolithic layer, or combinations thereof. For example, the multilayer film may comprise a plurality of microporous layers (e.g., 2, 3, 4, 5 layers) including a first microporous layer and a second microporous layer each independently from each other comprising at least one polyolefin, such as at least one polypropylene, at least one propylene-containing copolymer, at least one polyethylene, at least one ethylene-containing copolymer, or any combinations thereof. For example, the multilayer film may include a first microporous layer that is more robust and more resistant to damage and/or puncturing relative the second microporous layer. In this regard, the first microporous layer may be located or define the outermost layer of the first VPLI film facing away from the first nonwoven fabric, which may be more likely to exposed to accidental contact with tools and other materials. Accordingly, the first microporous layer may function as a sacrificial layer to protect the second microporous layer from damage while maintaining the desired level of breathability. By way of example, the multilayer film may consist of a plurality of microporous layers including a first microporous layer and a second microporous layer each independently from each other including at least one polyolefin, such as at least one polypropylene, at least one propylene-containing copolymer, at least one polyethylene, at least one ethylene-containing copolymer, or any combinations thereof.

In accordance with certain embodiments of the invention, the multilayer film may comprise a plurality of monolithic layers (e.g., 2, 3, 4, 5 layers) including a first monolithic layer and a second monolithic layer each independently from each other comprising at least one highly breathable polymer, such as at least one of a thermoplastic urethane, a polyether-block-amide copolymer, a polyether-block-ester copolymer, polyester-block-amide copolymer, a copolyester thermoplastic elastomer, or blends thereof. In a similar manner, the multilayer film may include a first monolithic layer that is more robust and more resistant to damage and/or puncturing relative the second monolithic layer. In this regard, the first monolithic layer may be located or define the outermost layer of the first VPLI film facing away from the first nonwoven fabric, which may be more likely to exposed to accidental contact with tools and other materials. Accordingly, the first monolithic layer may function as a sacrificial layer to protect the second monolithic layer from damage while maintaining the desired level of breathability. By way of example, the multilayer film may consist of a plurality of monolithic layers including a first monolithic layer and a second monolithic layer each independently from each other including at least one of a thermoplastic urethane, a polyether-block-amide copolymer, a polyether-block-ester copolymer, polyester-block-amide copolymer, a copolyester thermoplastic elastomer, or blends thereof. By way of example, the multilayer film may consist of a plurality of monolithic layers including a first monolithic layer and a second monolithic layer each independently from each other comprises at least one highly breathable polymer, such as at least one of a thermoplastic urethane, a polyether-block-amide copolymer, a polyether-block-ester copolymer, polyester-block-amide copolymer, a copolyester thermoplastic elastomer, or blends thereof.

In accordance with certain embodiments of the invention, the multilayer film may include the combination of a microporous layer and a monolithic layer. For instance, the microporous layer may function as a sacrificial layer as noted above for the monolithic layer. The multilayer film may include a base layer, a first skin layer, and a second skin layer, wherein the base layer is located directly or indirectly between the first skin layer and the second skin layer. In accordance with certain embodiments of the invention, at least one of the first skin layer and the second skin layer comprise respective microporous layers and the base layer comprises a monolithic layer.

In accordance with certain embodiments of the invention, the first VPLI may have a basis weight from about 10 to about 60 gsm, such as at least about any of the following: 10, 15, 20, 25, and 30 gsm, and/or at most about any of the following: 60, 50, 40, and 30 gsm. Additionally or alternatively, the first VPLI may have a thickness from about 5 to about 25 mils, such as at least about any of the following: 5, 8, 10, 12, and 15 mils, and/or at most about any of the following: 25, 20, 18, and 15 mils.

In accordance with certain embodiments of the invention, the first VPLI may have a hydrostatic pressure resistance from at least about 500 cm per AATCC 127-1995, such as at least about any of the following: 500, 550, 600, 650, 700, 750, and 800 cm, and/or at most about any of the following: 1500, 1400, 1300, 1200, 1100, 1000, 900, and 800 cm. Additionally or alternatively, the first VPLI may have a moisture vapor transmission rate (MVTR) from at least about 10 US Perms to about 60 US Perms per ASTM E96-A, such as at least about any of the following: 10, 12, 15, 18, 20, 25, and 30 US Perms, and/or at most about any of the following: 60, 50, 40, and 30 US Perms. Additionally or alternatively, the first VPLI may have an air permeance from at most about 0.1 L/m2 at 75 Pa per ASTM E2178, such as at most about any of the following: 0.1, 0.08, 0.05, 0.02 and 0.01 L/m2 at 75 Pa per ASTM E2178.

The first VPLI film, for example, may be melt-extruded directly onto the first nonwoven fabric. In this regard, the first VPLI film may be directly bonded to the first nonwoven fabric without the need of an adhesive composition located therebetween. The first VPLI film may, for example, at least partially penetrate into the first nonwoven fabric.

In accordance with certain embodiments of the invention, the adhesive layer may comprise a discontinuous layer of the adhesive composition, in which the discontinuous layer has one or more regions devoid of the adhesive composition. For example, the discontinuous layer of the adhesive composition may include a plurality of discrete zones of the adhesive composition surrounded by a continuous zone devoid of the adhesive composition.

Alternatively, the discontinuous layer of the adhesive composition may include a plurality of discrete zones of the adhesive composition and a plurality of discrete zones devoid of the adhesive composition provided in alternating fashion. The plurality of discrete zones of the adhesive composition may define an adhesive area on the first nonwoven fabric from about 20 to about 80% of a first surface of the first nonwoven fabric, such as at least about any of the following: 20, 25, 30, 35, and 40%, and/or at most about any of the following: 80, 75, 70, 65, 60, 55, 50, 45, and 40%.

In accordance with certain embodiments of the invention, the first nonwoven fabric has a first end and a second end along a cross-direction, and wherein the plurality of discrete zones of the adhesive composition include a first discrete zone of the adhesive composition at or proximate to the first end, a second discrete zone of the adhesive composition at or proximate to the first end, and a plurality of intermediate discrete zones of the adhesive composition located between the first discrete zone of the adhesive composition and the second discrete zone of the adhesive composition. The first discrete zone of the adhesive composition defines a first coating area, the second first discrete zone of the adhesive composition defines a second coating area, and the plurality of intermediate discrete zones of the adhesive composition have an average intermediate coating area, and wherein the first coating area and/or the second coating area is larger than the average intermediate coating area. Additionally or alternatively, the discontinuous adhesive layer may comprise a first ratio between the first coating area and the average intermediate coating area from about 2.5:1 to about 10:1, such as at least about any of the following: 2.5:1, 3:1, 3.5:1, 4:1, 4.5:1, 5:1, and 5.5:1, and/or at most about any of the following: 10:1, 9:1, 8:1, 7:1; 6:1, and 5.5:1. Additionally or alternatively, the discontinuous adhesive layer may comprise a second ratio between the second coating area and the average intermediate coating area from about 2.5:1 to about 10:1, such as at least about any of the following: 2.5:1, 3:1, 3.5:1, 4:1, 4.5:1, 5:1, and 5.5:1, and/or at most about any of the following: 10:1, 9:1, 8:1, 7:1; 6:1, and 5.5:1. Additionally or alternatively, the discontinuous adhesive layer may comprise a third ratio between (i) a total intermediate coating area comprising an aggregate of the plurality of intermediate discrete zones of the adhesive composition, and (ii) the aggregate of the first coating area and the second coating area from about 2:1 to about 5:1, such as at least about any of the following: 2:1, 2.2:1, 2.5:1, 2.8:1, 3:1, 3.2:1, and 3.5:1, and/or at most about any of the following: 5:1, 4.8:1, 4.5:1, 4.2:1, 4:1, 3.8:1, and 3.5:1.

In accordance with certain embodiments of the invention, the plurality of discrete zones of the adhesive composition may comprise linear lines, curved lines (e.g., waves, circular, S-shaped, etc.), or combinations thereof. Additionally or alternatively, the linear lines, curved lines, or combinations thereof extend along a machine direction or a cross-direction of the first nonwoven fabric.

Figure 3:
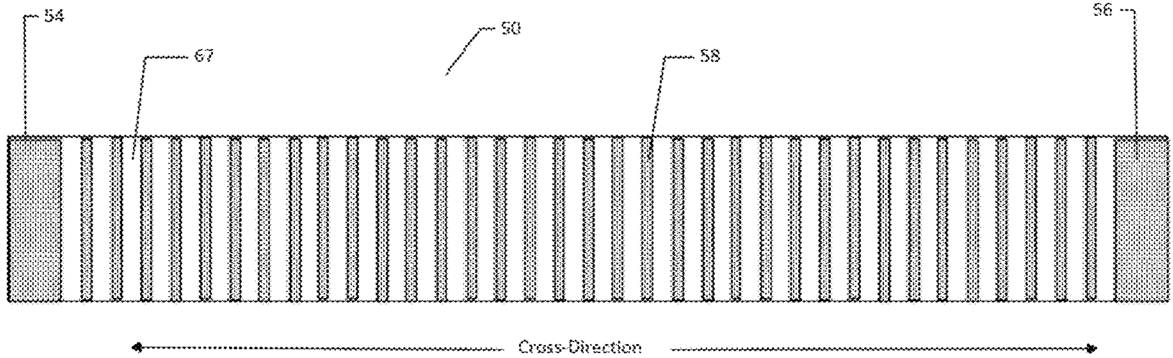
FIG. 3 illustrates a discontinuous adhesive layer including a plurality of discrete zones of an adhesive composition and a plurality of discrete regions that are devoid of any adhesive composition in accordance with certain embodiments of the invention.
Figure 4:
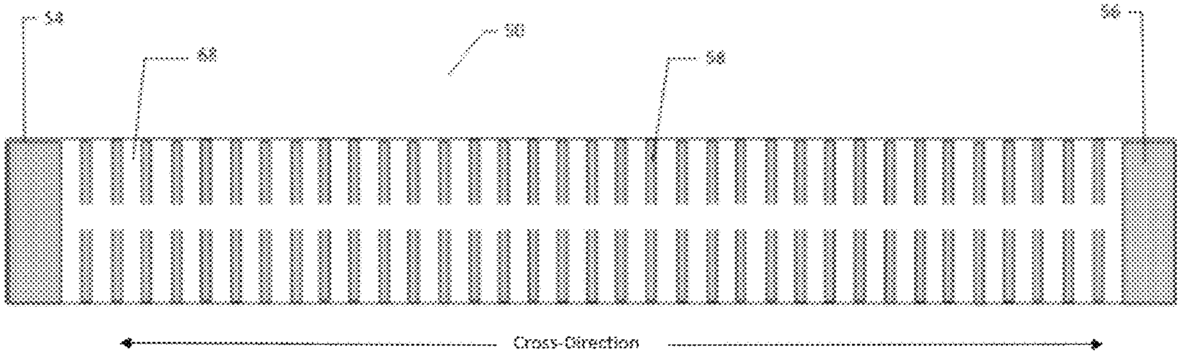
FIG. 4 illustrates another discontinuous adhesive layer including a continuous region devoid of any adhesive composition in accordance with certain embodiments of the invention.
Figure 5:
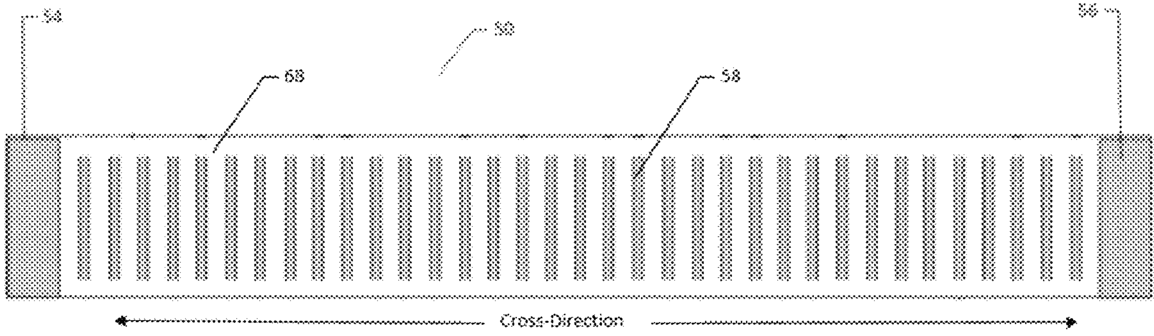
FIG. 5 illustrates another discontinuous adhesive layer including a continuous region devoid of any adhesive composition in accordance with certain embodiments of the invention.

FIG. 3, for example, illustrates a discontinuous adhesive layer 50 a plurality of discrete zones of an adhesive composition and a plurality of discrete regions that are devoid of any adhesive composition in accordance with certain embodiments of the invention. The plurality of discrete zones of the adhesive composition include a first discrete zone 54 of the adhesive composition at or proximate to the first end of the first nonwoven fabric, a second discrete zone 56 of the adhesive composition at or proximate to the second end of the first nonwoven fabric, and a plurality of intermediate discrete zones 58 of the adhesive composition located between the first discrete zone of the adhesive composition and the second discrete zone of the adhesive composition. Each of the plurality of discrete regions that are devoid of any adhesive composition 67 are located in an alternating fashion with the plurality of intermediate discrete zones 58 of the adhesive composition. FIG. 4 illustrates another discontinuous adhesive layer 50 including a continuous region 68 devoid of any adhesive composition in accordance with certain embodiments of the invention. FIG. 5 illustrates another discontinuous adhesive layer 50 including a continuous region 68 devoid of any adhesive composition in accordance with certain embodiments of the invention.

Figure 6:
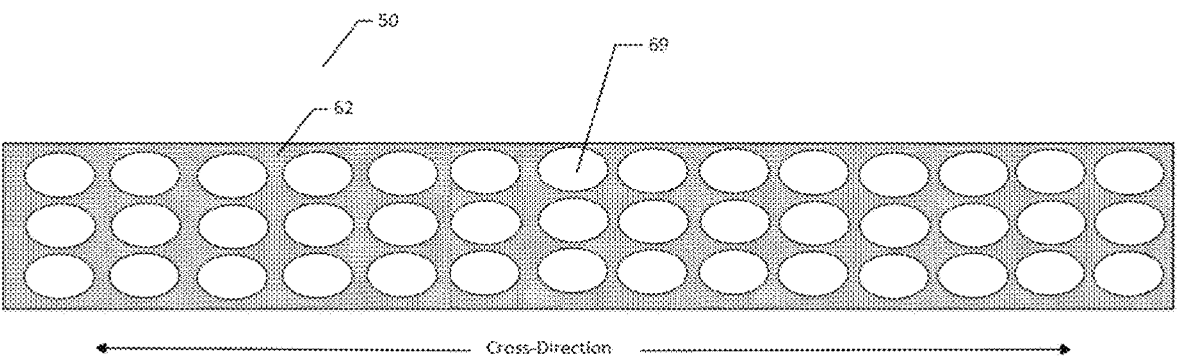
FIG. 6 illustrates another discontinuous adhesive layer including a plurality of separate islands being devoid of any adhesive composition in accordance with certain embodiments of the invention.

In accordance with certain embodiments of the invention, the discontinuous layer of the adhesive composition includes a continuous network of the adhesive composition and a plurality of discrete islands that are devoid of the adhesive composition, wherein the plurality of discrete islands are surrounded by the continuous network of the adhesive composition. FIG. 6, for example, illustrates a discontinuous adhesive layer 50 including a plurality of separate islands 69 being devoid of any adhesive composition surrounded by a network 62 of the adhesive composition in accordance with certain embodiments of the invention. In accordance with certain embodiments of the invention, the continuous network of the adhesive composition defines an adhesive area on the first nonwoven fabric from about 20 to about 80% of a first surface of the first nonwoven fabric, such as at least about any of the following: 20, 25, 30, 35, and 40%, and/or at most about any of the following: 80, 75, 70, 65, 60, 55, 50, 45, and 40%.

Figure 7:
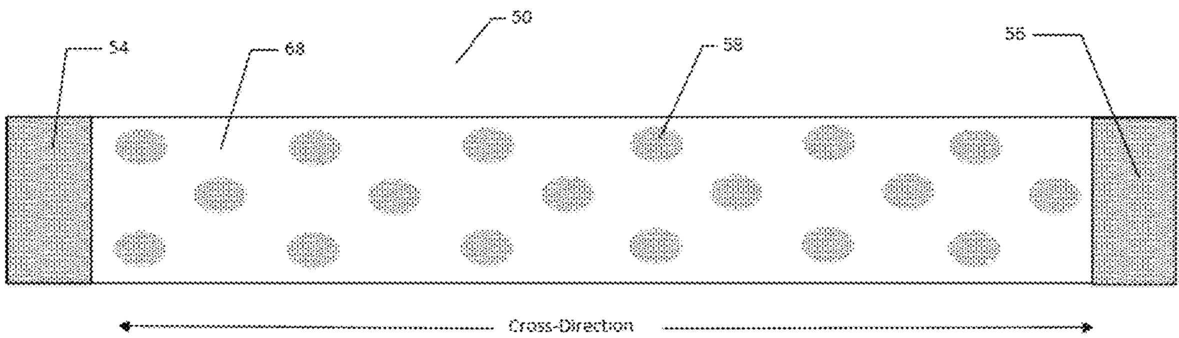
FIG. 7 illustrates another discontinuous adhesive layer including a continuous region devoid of any adhesive composition in accordance with certain embodiments of the invention.

FIG. 7 illustrates another discontinuous adhesive layer 50 including a continuous region 68 devoid of any adhesive composition in accordance with certain embodiments of the invention. The discontinuous adhesive layer 50 includes a first discrete zone 54 of the adhesive composition at or proximate to the first end of the first nonwoven fabric, a second discrete zone 56 of the adhesive composition at or proximate to the second end of the first nonwoven fabric, and a plurality of intermediate discrete zones 58 of the adhesive composition located between the first discrete zone of the adhesive composition and the second discrete zone of the adhesive composition. The plurality of intermediate discrete zones 58 of the adhesive composition are surrounded by the continuous region 68 devoid of any adhesive composition.

In accordance with certain embodiments of the invention, the adhesive layer may comprise a continuous layer of the adhesive composition. In this regard, the entirety of the first nonwoven fabric facing away from the first VPLI film may be coated with an adhesive composition. In such embodiments, it may be desirable to use a thinner coating of the adhesive composition and/or select an adhesive composition that is breathable to allow passage of water vapor therethrough.

In accordance with certain embodiments of the invention, the adhesive layer whether being discontinuous or continuous may have a basis weight from about 0.5 to about 5 gsm, such as at least about any of the following: 0.5, 0.8, 1, 1.2, 1.5, 1.8, 2, 2.2, and 2.5 gsm, and/or at most about any of the following: 5, 4.8, 4.5, 4.2, 4, 3.8, 3.5, 3.2, 3, 2.8, and 2.5 gsm. Additionally or alternatively, the adhesive composition is breathable and allows at least some passage of water vapor therethrough.

In accordance with certain embodiments of the invention, the adhesive composition comprises a hot melt adhesive, such as ethylene vinyl acetate copolymers; styrene-isoprene-styrene copolymers; styrene-butadiene-styrene copolymers; ethylene ethyl acrylate copolymers; and polyurethane reactive, butyl or halo-butyl rubbers, acrylic, ethylene propylene rubber (EPR), ethylene propylene diene terpolymer rubber (EPDM) or styrene/butadiene rubbers (SBR) and styrene-ethylene-butene-styrene copolymers. Additionally or alternatively, the adhesive composition may in particular include a rubber adhesive, such as a hot-melt rubber adhesive composition and/or a solvent-based rubber adhesive composition. Additionally or alternatively, the adhesive composition comprises a pressure sensitive adhesive, the pressure sensitive adhesive may comprise (meth)acrylic homopolymers and copolymers, such as for example isooctyl acrylate, 2-ethylhexyl acrylate. Some example adhesive composition, for instance, may include Thermogrip® 2211 that is commercially available from Bostik, Inc. (Wauwatosa, Wisconsin, U.S.A.), Thermogrip® 2571 commercially available from Bostik, Inc. (Wauwatosa, Wisconsin, U.S.A.), Technomelt® PS 1581NA commercially available from Henkel (Düsseldorf, Germany), 321-H commercially available from Hero Coatings (Newburyport, MA), and 915 can be obtained from Hero Coatings (Newburyport, MA). Additionally or alternatively, the adhesive composition comprises a solvent-based acrylic adhesive. Some example adhesive composition, for instance, may include Aroset™ S488 commercially available from Bostik, Inc. (Wauwatosa, Wisconsin, U.S.A.), Aroset™ 1085 commercially available from Bostik, Inc. (Wauwatosa, Wisconsin, U.S.A.), Durotack DT AH 115 commercially available from Henkel (Düsseldorf, Germany), Durotack DT 151A commercially available from Henkel (Düsseldorf, Germany), S8730T commercially available from Avery Dennison (Mill Hall, PA), S8655 commercially available from Avery Dennison (Mill Hall, PA), Oribain® BPS6080 and Oribain® STS0122 both commercially available from Toyo Ink (Tokyo, Japan).

In accordance with certain embodiments of the invention, adhesive composition may, for example, have various properties of certain ranges, including any of the following provided in Table 1 below:

TABLE 1

| Property | Range/Name |
|---|---|
| Non-volatiles | 25-75% |
| | 30-70% |
| | 35-65% |
| | 40-60% |
| | 45-55% |
| Viscosity | 100-10,000 cP |
| | 1000-8000 cP |
| | 1500-7000 cP |
| | 2000-5000 cP |
| | 2500-7000 cP |
| | 3000-6000 cP |
| Solvents | Ethyl acetate, methylethyl ketone toluene, isopropanol, heptane |
| Density | 7.0-8.0 lbs/gal |
| Flash point range (SETA) | 20-73° F. |

In accordance with certain embodiments of the invention, the release liner includes a release surface located adjacent the adhesive layer, in which the release liner comprises a film or a paper sheet. For example, the release surface comprises a low surface energy release surface coating, such as silicones, siloxanes, fluoropolymers, and urethanes. In this regard, an adhesion strength between the adhesive layer and the release liner is less than an adhesion strength between the adhesive layer and the first nonwoven fabric. As such, the release liner may be peeled away from the self-adhering article to expose the adhesive layer prior to mounting onto a desired surface.

Figure 8:
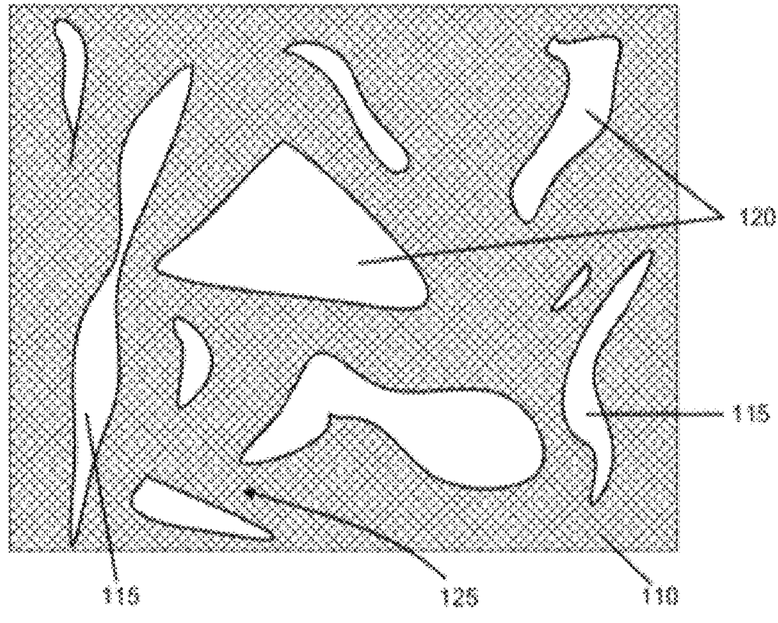
FIG. 8 illustrates a discontinuous meltblown layer including a plurality of meltblown shot and meltblown rope deposited onto the first VPLI film.
Figure 9:
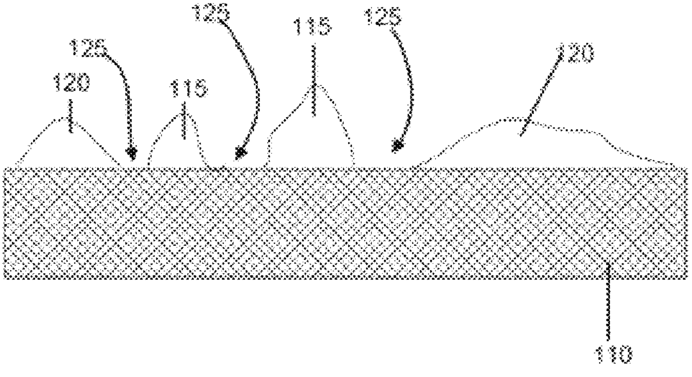
FIG. 9 illustrates a side view of a discontinuous meltblown layer including a plurality of meltblown shot and meltblown rope deposited onto the first VPLI film.

In accordance with certain embodiments of the invention, the self-adhering article may further comprise a three-dimensional, non-uniform or non-continuous meltblown layer positioned on an outer surface of the first VPLI film. The meltblown layer may comprise meltblown shot, meltblown ropes, or both, in which the meltblown shot, the meltblown rope, or both is randomly and irregularly distributed on the outer surface of the first VPLI film. FIG. 8, for instance, illustrates a top view of a self-adhering article according to an example embodiment including a plurality of meltblown shot and meltblown rope deposited onto the side of the first VPLI film facing away from the first nonwoven fabric. FIG. 9, for example, illustrates a side view of the meltblown shot and meltblown rope deposited onto the first VPLI according to an embodiment of the invention. As shown in FIG. 8 and FIG. 9, for example, the non-continuous meltblown layer 110 has a plurality of three-dimensional protrusions in the form of meltblown ropes 115 and meltblown shot 120. As illustrated in FIG. 8 and FIG. 9, the meltblown ropes 115 and meltblown shot 120 are generally isolated from each other (e.g., a non-continuous meltblown layer). In this regard, continuous air gaps 125 may be formed between the meltblown ropes 115 and/or meltblown shot 120. FIG. 9, for instance, illustrates a side view of illustrating the formation of the continuous air gaps 125. Although FIG. 8 and FIG. 9 illustrate a non-continuous meltblown layer, certain embodiments of the invention may comprise a non-uniform meltblown layer instead of a non-continuous meltblown layer, as disclosed herein. In such embodiments, for example, the non-uniform meltblown layer may comprise individual meltblown shot and/or meltblown ropes integrated within a continuous layer of interconnected meltblown fibers and essentially covering or overlying the entire surface of first VPLI film facing away from the first nonwoven fabric.

In accordance with certain embodiments of the invention, the self-adhering article comprises a drainage efficiency from about 90% to about 100% per ASTM E2273, such as at least about 90, 92, 94, and 95%, and/or at most about any of the following: 100, 99, 98, 96, and 95%. Additionally or alternatively, the three-dimensional, non-uniform or non-continuous meltblown layer comprises at least one of a polypropylene, an ethylene-propylene impact copolymer blend, or any combination thereof. The meltblown shot, for example, may comprise irregularly shaped fibers, wads, or particles. Additionally or alternatively, the three-dimensional, non-uniform or non-continuous meltblown layer comprises an average shot height, rope height, or both from about 0.1 mm to about 1.0 mm, such as at least about any of the following: 0.1, 0.2, 0.3, 0.4, and 0.5 mm, and/or at most about any of the following: 1, 0.9, 0.8, 0.7, 0.6, and 0.5 mm. Additionally or alternatively, the three-dimensional, non-uniform or non-continuous meltblown layer may comprise a basis weight from about 1 gsm to about 20 gsm, such as at least about any of the following: 1, 2, 3, 5, 8, and 10 gsm, and/or at most about any of the following: 20, 18, 15, 12, and 10 gsm.

In accordance with certain embodiments of the invention, the weather resistive barrier has a basis weight from about 60 to about 250 gsm, such as at least about any of the following: 60, 70, 80, 90, 100, 110, 120, 130, 140, and 150 gsm, and/or at most about any of the following: 250, 220, 200, 180, 160, and 150 gsm. Additionally or alternatively, the weather resistive barrier has a thickness from about 8 to about 30 mils, such as at least about any of the following: 8, 10, 12, 15, 18, and 20 mils, and/or at most about any of the following: 20, 22, 24, 25, 26, 28, and 30 mils.

In accordance with certain embodiments of the invention, the weather resistive barrier has a hydrostatic pressure resistance from at least about 500 cm per AATCC 127-1995, such as at least about any of the following: 500, 550, 600, 650, 700, 750, and 800 cm, and/or at most about any of the following: 1500, 1400, 1300, 1200, 1100, 1000, 900, and 800 cm. Additionally or alternatively, the weather resistive barrier has a moisture vapor transmission rate (MVTR) from at least about 10 US Perms to about 60 US Perms per ASTM E96-A, such as at least about any of the following: 10, 12, 15, 18, 20, 25, and 30 US Perms, and/or at most about any of the following: 60, 50, 40, and 30 US Perms. Additionally or alternatively, the weather resistive barrier has an air permeance from at most about 0.1 L/m2 at 75 Pa per ASTM E2178, such as at most about any of the following: 0.1, 0.08, 0.05, 0.02 and 0.01 L/m2 at 75 Pa per ASTM E2178.

In accordance with certain embodiments of the invention, the weather resistive barrier has a peel adhesion to an oriented strand board (OSB) of at least about 1.5 lbs/inch per ASTM D3330 Method F (20 minutes and 24 hour dwell time), such as at least about 1.5, 1.8, 2, 2.2, 2.5, 2.8 and 3 lbs/inch, and/or at most about any of the following 6, 5.5, 5, 4.5, 4, 3.5, and 3 lbs/inch. Additionally or alternatively, the weather resistive barrier has a peel adhesion to anodized aluminum of at least about 1.5 lbs/inch per ASTM D3330 Method F (20 minutes and 24 hour dwell time), such as at least about 1.5, 1.8, 2, 2.2, 2.5, 2.8 and 3 lbs/inch, and/or at most about any of the following 6, 5.5, 5, 4.5, 4, 3.5, and 3 lbs/inch. Additionally or alternatively, the weather resistive barrier has a peel adhesion to vinyl of at least about 1.5 lbs/inch per ASTM D3330 Method F (20 minutes and 24 hour dwell time), such as at least about 1.5, 1.8, 2, 2.2, 2.5, 2.8 and 3 lbs/inch, and/or at most about any of the following 6, 5.5, 5, 4.5, 4, 3.5, and 3 lbs/inch. Additionally or alternatively, the weather resistive barrier has a peel adhesion to plywood (APA Grade Exposure 1) of at least about 1.5 lbs/inch per ASTM D3330 Method F (20 minutes and 24 hour dwell time), such as at least about 1.5, 1.8, 2, 2.2, 2.5, 2.8 and 3 lbs/inch, and/or at most about any of the following 6, 5.5, 5, 4.5, 4, 3.5, and 3 lbs/inch.

In accordance with certain embodiments of the invention, the weather resistive barrier has a machine direction trapezoidal tear resistance from about 25 to about 40 lbs per ASTM D5733, such as at least about any of the following: 25, 26, 28, and 30 lbs, and/or at most about any of the following: 40, 38, 36, 35, 34, 32, and 30 lbs. Additionally or alternatively, the weather resistive barrier has a cross-direction trapezoidal tear resistance from about 25 to about 40 lbs per ASTM D5733, such as at least about any of the following: 25, 26, 28, and 30 lbs, and/or at most about any of the following: 40, 38, 36, 35, 34, 32, and 30 lbs. Additionally or alternatively, the weather resistive barrier has a machine direction breaking strength from about 50 to about 80 lbs per ASTM D5034, such as at least about any of the following: 50, 52, 55, 58, 60, 62, 65, and 68 lbs, and/or at most about any of the following: 80, 78, 75, 72, 70, and 68 lbs. Additionally or alternatively, the weather resistive barrier has a cross-direction breaking strength from about 50 to about 80 lbs per ASTM D5034, such as at least about any of the following: 50, 52, 55, 58, 60, 62, 65, and 68 lbs, and/or at most about any of the following: 80, 78, 75, 72, 70, and 68 lbs.

In accordance with certain embodiments of the invention, the weather resistive barrier has a Gurley Hill Porosity from about 2500 s/100 cc to about 5000 s/100 cc, such as at least about any of the following: 2500, 2800, 3000, 3200, and 3500 s/100 cc, and/or at most about any of the following: 5000, 4800, 4500, 4200, 4000, 3800, and 3500 s/100 cc.

In accordance with certain embodiments of the invention, the self-adhering article comprises a width from about 3 feet to about 10 feet, such as at least about any of the following: 4, 5, and 6 feet, and/or at most about any of the following: 10, 8, and 6 feet.

In another aspect, certain embodiments of the invention provide a method of making a self-adhering article, such as a housewrap. The method may comprise the following: (i) melt extruding a first vapor-permeable and liquid impermeable (VPLI) film directly onto a first surface of a first nonwoven fabric to form a weather resistive barrier or providing a weather resistive barrier comprising a first VPLI film melt-extruded onto the first nonwoven fabric; (ii) depositing an adhesive layer comprising an adhesive composition directly onto a second surface of the first nonwoven fabric, wherein the first nonwoven fabric is located between the first VPLI film and the adhesive layer; and (iii) applying a release liner over and in contact with the adhesive layer, wherein the adhesive layer is located between the first nonwoven fabric and the release liner to form a self-adhering article.

In accordance with certain embodiments of the invention, the step of depositing the adhesive layer may comprise a die coating operation (e.g., a slot-die coating operation), a spraying operation, a blade coating operation, or any combination thereof. The deposition of the adhesive layer may impart a continuous or discontinuous adhesive layer, for example, on the first nonwoven fabric having a variety of thickness such as those described and disclosed herein. Additionally or alternatively, the method may further comprise depositing a three-dimensional, non-uniform or non-continuous meltblown layer positioned on an outer surface of the first VPLI film, the meltblown layer comprising meltblown shot, meltblown ropes, or both. In this regard, the meltblown shot, the meltblown rope, or both may be randomly and irregularly distributed on the outer surface of the first VPLI film.

In yet another aspect, certain embodiments of the invention provide a building assembly, in which the building assembly may comprise an inner sheathing member, an exterior building material, and a self-adhering article, such as those described and disclosed herein, wherein a release liner has been stripped (e.g., peeled) away and an adhesive layer bonds the weather resistive barrier to the interior sheathing member.

In accordance with certain embodiments of the invention, the self-adhering article may include a three-dimensional, non-uniform or non-continuous meltblown layer positioned on an outer surface, for example, of the first VPLI film. The meltblown layer may comprise meltblown shot, meltblown ropes, or both. The the meltblown shot, the meltblown rope, or both may be randomly and irregularly distributed on the outer surface, for example, of the first VPLI film. In such instances, for instance, the meltblown shot, the meltblown rope, or a combination thereof may define a continuous air gap, which enables multi-direction flow of a liquid along the outer surface of the first VPLI film, between the weather resistive barrier and the exterior building material. The continuous air gap may comprise a height corresponding to the average shot height, rope height, or both.

Figure 10:
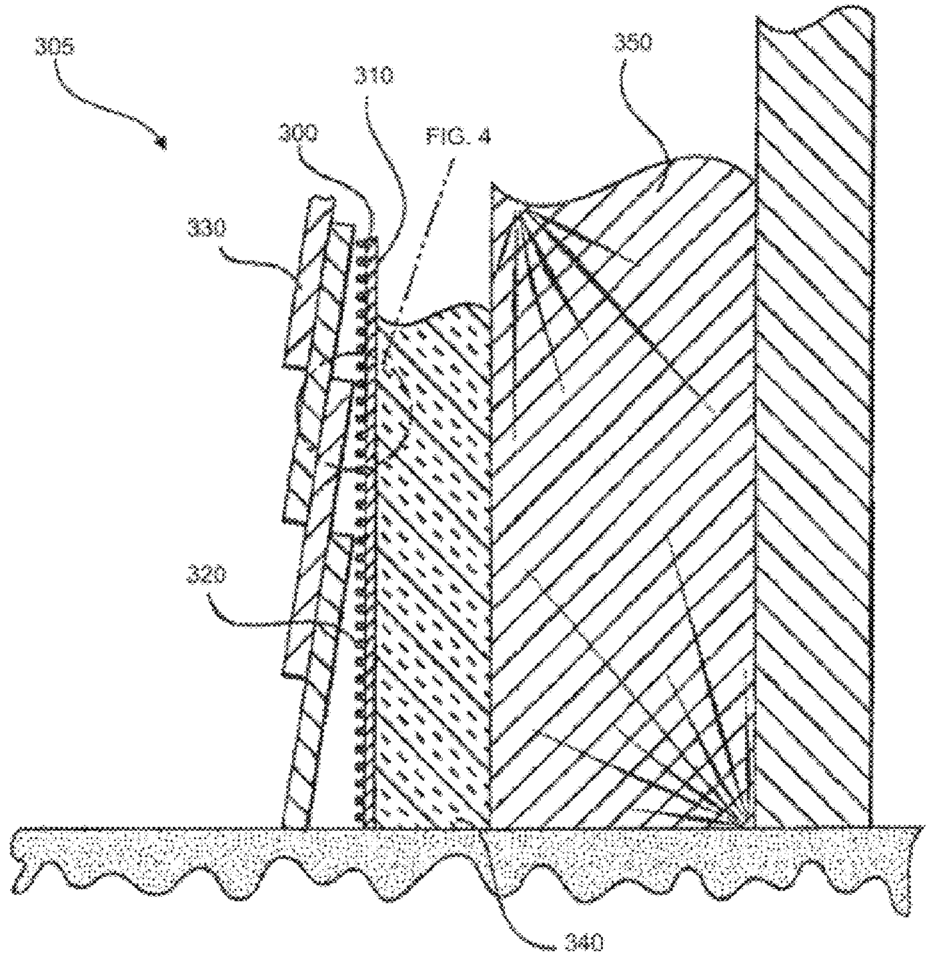
FIG. 10 illustrates a cut-away side view of a building assembly according to certain embodiments of the invention.

FIG. 10, for example, illustrates a cut-away side view of a building assembly according to certain embodiments of the invention. As shown in FIG. 10, for instance, the building assembly 305 includes inner sheathing members 340 affixed to support posts 350. In some embodiments of the invention, for example, the inner sheathing members 340 may be formed of panels of plywood, oriented strand board, particle board, insulated concrete, or any other materials permitted by local building codes. During construction of the building assembly 305, the self-adhering article 300 may have the release liner removed to expose the adhesive layer and adhesively secured to the inner sheathing members 340 such that the weather resistive barrier 310 completely covers the inner sheathing members 340 and such that the first VPLI film faces away from the inner sheathing members 340. In embodiments including a layer of meltblown ropes and/or meltblown shot 320 disposed on the first VPLI film, the layer of meltblown ropes and/or meltblown shot faces away from the inner sheathing members 340. In some embodiments of the invention, for instance, the self-adhering article 300 may be secured to the inner sheathing members 340 without the use of staples or the like. The self-adhering article 300 may extend horizontally or vertically within the building assembly 305. Several slightly-overlapping, horizontally or vertically-extending rows of the self-adhering article 300 may be required to cover the entire elevation of the building assembly 305. In this regard, the continuous ventilation paths P formed by the meltblown ropes and/or meltblown shot 320, if present, may permit moisture to drain downwardly within the building assembly 305 along the meltblown ropes and/or meltblown shot 320. An exterior building material 330 may be affixed on the outer side of the building assembly 305 such that it overlies the self-adhering article 300 and sandwiches the self-adhering article 300 between the inner sheathing member 340 and the exterior building material 330. In some embodiments of the invention, for example, the exterior building material 330 may be a wood or fiber-cement siding product or wooden shingles such as cedar shakes. The exterior building material 330 may also be brick, stone, stucco, exterior insulation finish systems (EIFS), vinyl, metal, asphalt, rubber, thermoplastic, and other suitable exterior siding and roofing materials. In this regard, the building assembly 305 may be an exterior wall of a building, an exterior roof of a building and/or the like.

Figure 11:
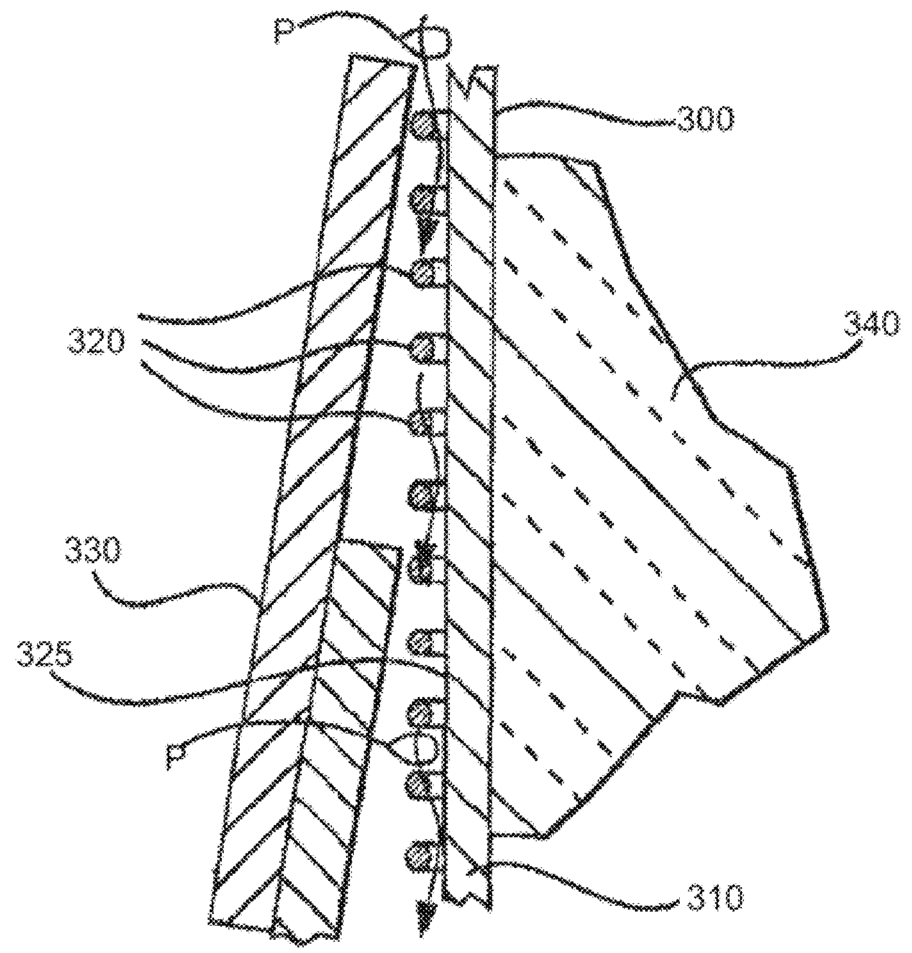
FIG. 11 illustrates a portion of the building assembly illustrated in FIG. 10 according to certain embodiments of the invention.
Figure 12:
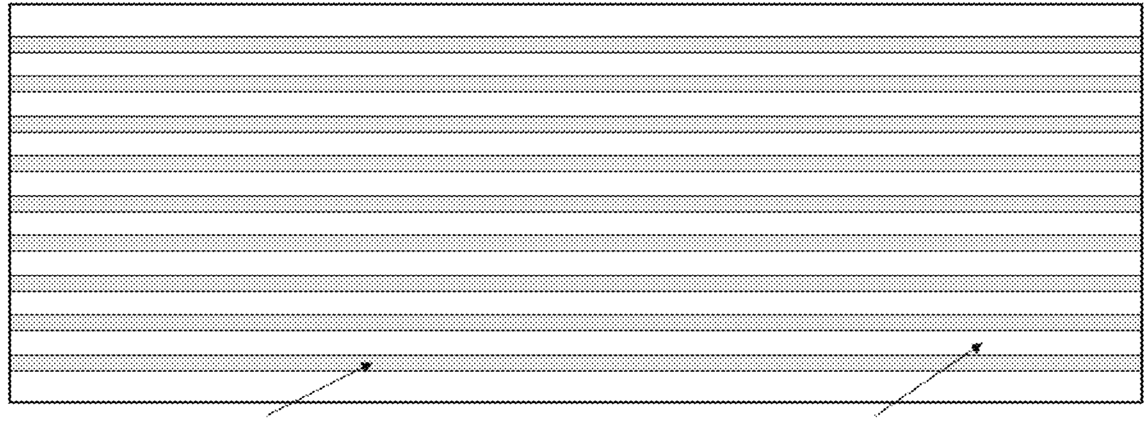
FIG. 12 illustrates a discontinuous adhesive layer in accordance with certain embodiments of the invention.

FIG. 11, for instance, illustrates a portion of the building assembly illustrated in FIG. 10 according to an embodiment of the invention. As shown in FIG. 11, for example, the meltblown ropes and/or meltblown shot 320 may be irregularly spaced on the weather resistive barrier 310 such that continuous air gaps 325 may be formed between the exterior building material and the weather resistive barrier 310. In this regard, the continuous air gaps 325 may provide drainage and ventilation paths P within the building assembly 305. Any moisture which collects within the building assembly 305 may be provided with a path to drain downwardly under the force of gravity and out of the building assembly 305. The plurality of continuous air gaps 325 dispersed throughout the building assembly 305 may also enable the circulation of air between the inner sheathing members 340 and the exterior building material 330 to aid in drying or evaporating any moisture present within the building assembly 305.

EXAMPLES

The present disclosure is further illustrated by the following examples, which in no way should be construed as being limiting. That is, the specific features described in the following examples are merely illustrative and not limiting.

Example Fabric Laminate Construction Used for Zone Coating with Adhesive

A breathable membrane (e.g., weather resistive barrier), in accordance with certain example embodiments, was produced that included a first layer of a polypropylene nonwoven fabric with the basis weight from 1.5-2.5 oz/yd$^2$, and a second layer that comprises a multilayer VPLI film (e.g., PP/PE/PP multilayer-breathable VPLI film) having a basis weight from 25-50 gsm. The general pattern for the adhesive layer can be described as alternating continuous dry (e.g., regions devoid of an adhesive composition) and wet (e.g., regions having an adhesive composition) zones are applied in the machine direction: Dry zones (e.g., regions devoid of an adhesive composition) may have a width ranging from 1/16" to 6" wide, and the wet zones (e.g., regions having an adhesive composition) may have a width range from 1/16" to 6" wide. The width of dry and wet zones may or may be arranged in a repeating or non-repeating pattern, such as those described and disclosed herein. Table 2 summarizes peel strength after low temperature exposure.

In accordance with certain embodiments of the invention, however, the first layer (e.g., nonwoven fabric) may range from 0.9 to 10 oz/yd$^2$ (30 to 340 gsm), the second layer (e.g., VPLI film) may range from 15 to 55 gsm, and a total basis weight may range from 45 to 395 gsm (e.g., 70-150 gsm, or 75-120 gsm).

TABLE 2

| | | | | Adhesive Type | | | |
|---|---|---|---|---|---|---|---|
| Method | Dwell | Conditioning | Sub. | Acrylic WRB Acrylic Trial 1 | Rubber Henry Blueskin | Acrylic Obdyke Hydrograp | Target |
| Low Temperature Exposure 90° Degree Peel (lbs./in) | 24 hrs. - specified temp. | 0 F. | Plywood | 0.88 | Fail | 0.5 | 1.5 |
| | | 10 F. | | 3.6 | 0.35 | 1.9 | |
| | | 20 F. | | 3.8 | 0.36 | 1.5 | |
| | | 30 F. | | 5.2 | 0.54 | 2 | |
| | | 0 F. | OSB | 1.08 | Fail | 0.3 | 1.5 |
| | | 10 F. | | 2.6 | 0.15 | 0.3 | |
| | | 20 F. | | 1.6 | 0.13 | 0.8 | |
| | | 30 F. | | 1.58 | 0.18 | 1 | |
| | | 0 F. | SS | 4.8 | 1.44 | 2.4 | 1.5 |
| | | 10 F. | | 4.6 | 1.82 | 2.2 | |
| | | 20 F. | | 4.4 | 3.21 | 3.1 | |
| | | 30 F. | | 7 | 3.13 | 3.3 | |
| | | 0 F. | Typar Backing MD | 1.08 | Fail | 0.4 | 1.5 |
| | | 10 F. | | 2.2 | 0.35 | 0.7 | |
| | | 20 F. | | 2.4 | 0.53 | 1 | |
| | | 30 F. | | 2.4 | 0.8 | 1.3 | |
| | | 0 F. | Typar Backing CD | 1.2 | Fail | 0.4 | 1.5 |
| | | 10 F. | | 2.6 | 0.28 | 0.6 | |
| | | 20 F. | | 2.4 | 0.46 | 1.1 | |
| | | 30 F. | | 2.4 | 0.88 | 1.3 | |

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein

What is claimed is:

1. A self-adhering article, comprising:

(i) a weather resistive barrier comprising a first nonwoven fabric attached to a first surface of a first vapor-permeable and liquid impermeable (VPLI) film, a second surface of the VPLI film comprising a first outer surface of the self-adhering article;

(ii) an adhesive layer comprising an adhesive composition, the adhesive layer being located adjacent the first nonwoven fabric, wherein the first nonwoven fabric is located between the first VPLI film and the adhesive layer, wherein the adhesive layer comprises a discontinuous layer of the adhesive composition, the discontinuous layer of the adhesive composition including a plurality of discrete zones of the adhesive composition surrounded by a continuous zone devoid of the adhesive composition;

(iii) a first surface of a release liner located adjacent the adhesive layer, wherein the adhesive layer is located between the first nonwoven fabric and the release liner, a second surface of the release liner comprising a second outer surface of the self-adhering article positioned opposite the first outer surface, wherein the first VPLI film comprises at least one propylene-containing copolymer, at least one polyethylene, at least one ethylene-containing copolymer, or any combinations thereof, and has moisture vapor transmission rate (MVTR) from at least about 10 US Perms to about 60 US Perms.

2. The self-adhering article of claim 1, wherein the first nonwoven fabric comprises at least one spunbond layer, at least one meltblown layer, or any combination thereof.

3. The self-adhering article of claim 1, wherein the first nonwoven fabric comprises at least one polyolefin selected from a group consisting of polypropylene, polyethylene, ethylene-polypropylene impact polymer, or any combination thereof.

4. The self-adhering article of claim 1, wherein the first nonwoven fabric has a basis weight from about 50 to about 140 gsm.

5. The self-adhering article of claim 1, wherein the first VPLI film comprises single layer film, wherein the single layer film is a microporous film or a monolithic film.

6. The self-adhering article of claim 1, wherein the first VPLI film comprises a multilayer film comprising at least one microporous layer, at least one monolithic layer, or combinations thereof.

7. The self-adhering article of claim 6, wherein the multilayer film comprises a plurality of microporous layers including a first microporous layer and a second microporous layer each independently from each other comprising at least one polyolefin, at least one propylene-containing copolymer, at least one polyethylene, at least one ethylene-containing copolymer, or any combinations thereof.

8. The self-adhering article of claim 6, wherein the multilayer film comprises a plurality of monolithic layers including a first monolithic layer and a second monolithic layer each independently from each other comprises at least one highly breathable polymer comprising at least one of a thermoplastic urethane, a polyether-block-amide copolymer, a polyether-block-ester copolymer, polyester-block-amide copolymer, a copolyester thermoplastic elastomer, or blends thereof.

9. The self-adhering article of claim 1, wherein the first VPLI film has a basis weight from about 10 to about 60 gsm.

10. The self-adhering article of claim 1, wherein the first VPLI film has a thickness from about 5 to about 25 mils.

11. The self-adhering article of claim 1, wherein the first VPLI film is melt-extruded directly onto the first nonwoven fabric.

12. The self-adhering article of claim 1, further comprising a three-dimensional, non-uniform or non-continuous meltblown layer positioned on an outer surface of the first VPLI film, the meltblown layer comprising meltblown shot, meltblown ropes, or both; wherein the meltblown shot, the meltblown rope, or both is randomly and irregularly distributed on the outer surface of the first VPLI film.

13. A self-adhering article, comprising:

(i) a weather resistive barrier comprising a first nonwoven fabric attached to a first vapor-permeable and liquid impermeable (VPLI) film;

(ii) an adhesive layer comprising an adhesive composition, the adhesive layer being located adjacent the first nonwoven fabric, wherein the first nonwoven fabric is located between the first VPLI film and the adhesive layer, wherein the adhesive layer comprises a discontinuous layer of the adhesive composition, wherein the discontinuous layer of the adhesive composition includes a plurality of discrete zones of the adhesive composition surrounded by a continuous zone devoid of the adhesive composition;

(iii) a release liner located adjacent the adhesive layer, wherein the adhesive layer is located between the first nonwoven fabric and the release liner, wherein the first nonwoven fabric has a first end and a second end along a cross-direction, and wherein the plurality of discrete zones of the adhesive composition include a first discrete zone of the adhesive composition at or proximate to the first end, a second discrete zone of the adhesive composition at or proximate to the second end, and a plurality of intermediate discrete zones of the adhesive composition located between the first discrete zone of the adhesive composition and the second discrete zone of the adhesive composition; wherein the first discrete zone of the adhesive composition defines a first coating area, the second first discrete zone of the adhesive composition defines a second coating area, and the plurality of intermediate discrete zones of the adhesive composition have an average intermediate coating area per intermediate discrete zone, and wherein the first coating area and/or the second coating area is larger than the average intermediate coating area.

14. The self-adhering article of claim 13, further comprising a first ratio between the first coating area and the average intermediate coating area from about 2.5:1 to about 10:1.

15. The self-adhering article of claim 13, further comprising a third ratio between (i) a total intermediate coating area comprising an aggregate of the plurality of intermediate discrete zones of the adhesive composition, and (ii) an aggregate of the first coating area and the second coating area from about 2:1 to about 5:1.

* * * * *